Sept. 29, 1959   J. J. GREVICH   2,906,847
POWER DRIVEN HAND HEAT SEALING UNIT
Filed Oct. 29, 1951   5 Sheets-Sheet 1
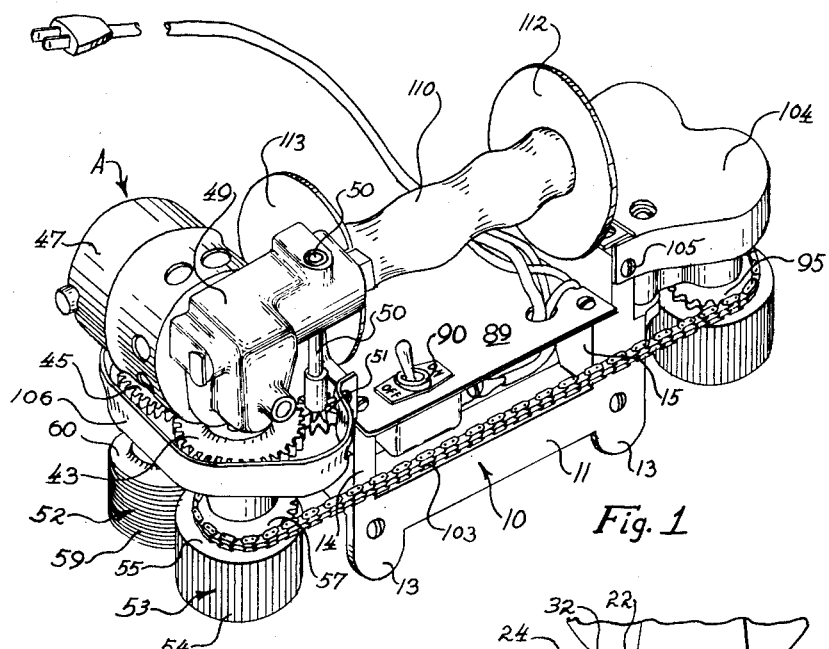
Fig. 1
Fig. 5
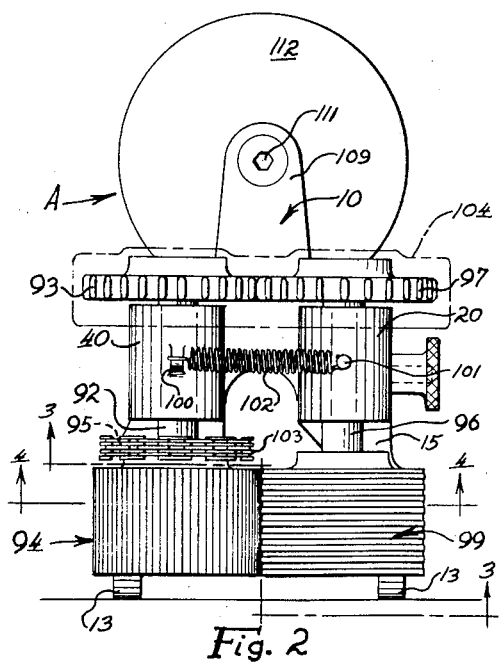
Fig. 2
INVENTOR
John J. Grevich
BY Robert M. Dunning
ATTORNEY Sept. 29, 1959   J. J. GREVICH   2,906,847
POWER DRIVEN HAND HEAT SEALING UNIT
Filed Oct. 29, 1951   5 Sheets-Sheet 2

INVENTOR
John J. Grevich
BY Robert M. Dunning
ATTORNEY

INVENTOR
John J. Grevich
BY Robert M. Dunning
ATTORNEY

Sept. 29, 1959  J. J. GREVICH  2,906,847
POWER DRIVEN HAND HEAT SEALING UNIT
Filed Oct. 29, 1951  5 Sheets-Sheet 4

INVENTOR
John J. Grevich
BY Robert M. Dunning
ATTORNEY

Sept. 29, 1959   J. J. GREVICH   2,906,847
POWER DRIVEN HAND HEAT SEALING UNIT
Filed Oct. 29, 1951   5 Sheets-Sheet 5

INVENTOR
John J. Grevich
BY Robert M. Dunning
ATTORNEY

United States Patent Office 2,906,847
Patented Sept. 29, 1959

2,906,847

POWER DRIVEN HAND HEAT SEALING UNIT

John J. Grevich, New Richmond, Wis., assignor to Doughboy Industries, Inc., New Richmond, Wis., a corporation of Wisconsin Application October 29, 1951, Serial No. 253,735

6 Claims. (Cl. 219—21)

This invention relates to an improvement in power driven hand heat sealing unit and deals particularly with a portable heat sealing unit which is motor driven.

Various types of portable heat sealing units have been previously provided. One of the difficulties usually experienced with such units lies in the fact that no means is provided of determining the time interval during which the member to be sealed is engaged between the heating shoes. As a result the sealing is erratic and non-uniform, as some of the members being sealed are engaged for too long a time interval with the heating shoes while others of the members to be sealed are engaged with the heating shoes for too short a period. It is a primary feature of the present invention to provide a portable unit which insures a predetermined heating time interval during which the seal is effected.

An object of the present invention resides in the provision of a small portable heat sealing unit having a pair of heating shoes between which a bag or other member to be sealed may extend. Two pairs of rollers are supported at opposite ends of the heating shoes and means are provided for driving these rollers in unison. The rollers of each pair rotate in opposite directions and engage on opposite sides of the bag or other member to be sealed to force the member to be sealed between the heating shoes. One set of rollers acts to force the bag toward the heating shoes, while the other set of rollers pulls the member to be sealed away from the heating shoes. Thus the member to be sealed remains in contact with the heating shoes a fixed period of time.

A feature of the present invention resides in the provision of a pair of elongated heating shoes which enclose or contact heating elements. One of the heating shoes is resiliently urged toward the other so that direct contact with members of different thicknesses is insured, or so that the shoes may supply radiant heat to the members being sealed.

A further feature of the present invention resides in the provision of a heat sealing unit having a pair of elongated parallel heating shoes and in having a pair of rollers rotatably supported at each end thereof. The rollers of each pair are connected to rotate in unison in opposite directions. The pairs of rollers are connected by suitable drive mechanism so that all of the rollers may rotate at a similar speed. One roller of each pair is resiliently urged toward the other so that members of varying thicknesses may pass between the rollers.

A further feature of the present invention resides in the provision of a hand heat sealer having a supporting handle by means of which it may be lifted or moved. The handle is so arranged as to be above the center of gravity of the unit, facilitating the handling of the device.

A further feature of the present invention lies in the fact that the rollers at opposite ends of the heating shoes may be connected by parallel chains or the like which may engage opposite sides of the member to be sealed throughout the length of the heating shoes. Where the members being sealed are of a length substantially equal to the distance between the pairs of rollers, the chains are not important, as the member is at all times engaged between at least one pair of rollers. However, where shorter members are to be sealed, the chains insure a constant speed of movement past the heating shoes.

A further feature of this invention resides in employing resilient supports for the chains, when such chains are employed, so that the members being sealed will be gripped between the chains. The resilient chain support also compensates for members of different thicknesses.

These and other objects and novel features of the present invention will be more clearly and fully set forth in the following specification and claims.

In the drawings forming a part of the specification:

Figure 1 is a perspective view of the heat sealing unit in readiness for operation.

Figure 2 is an end elevation view of the sealer shown in Figure 1.

Figure 5 is a transverse section through the unit, the position of the section being indicated by the line 5—5 of Figure 3.

Figure 3:
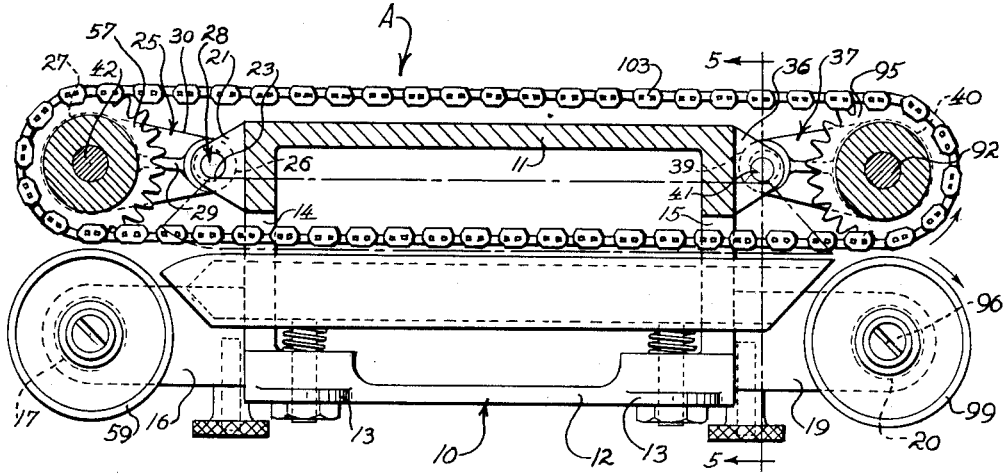
Figure 3 is a horizontal sectional view through the heat sealing unit, the position of the section being indicated by the line 3—3 of Figure 2.

The heat sealing unit includes a frame indicated in general by the numeral 10. The frame 10 includes a pair of spaced side members 11 and 12 which are provided with downwardly projecting legs 13 to act as a support for the unit when the same is resting upon a table or other flat surface. The frame sides 10 and 11 are connected at each end by transversely extending frame portions 14 and 15. The cross member 14 is provided with a longitudinally extending channel shaped projection 16 having a vertical bearing 17 supported thereby. The cross member 15 is provided with a similar longitudinally extending projection 19 having a vertical bearing 20 therein. The projections 16 and 19 are both located on the same side of the longitudinal center of the frame for a purpose which will be later more clearly described.

The cross member 14 is also provided with a pair of vertically spaced projecting lugs 21 and 22. The lowermost lug 21 is provided with an aperture 23 therein while the upper projection 22 is provided with a larger aperture 24 therein.

An arm 25 of substantial vertical depth is designed for support between the projections 21 and 22. The arm 25 includes a pair of spaced bearings 26 and 27 which are connected by a connecting web 29. Stiffening webs 30 may also be provided projecting from opposite sides of the web 29 between the bearings 26 and 27. The arm 25 is supported by means of an eccentric pivot 28, best illustrated in Figure 5 of the drawings. This eccentric 28 includes a cylindrical central portion 31 and a pair of cylindrical aligned end portions 32 and 33 which are arranged on a common axis off-set from the axis of the cylindrical portion 31. In the particular arrangement illustrated the ends 32 and 33 extend with one side substantially flush with a side of the center portion 31.

The aperture 23 in the lower projection 21 is of proper size to snugly accommodate the projection 33. A set screw 34 or other suitable means is provided for holding the eccentric in adjusted position. The aperture 24 in the upper projection 22 is of sufficient diameter to accommodate the central portion 31 of the eccentric pivot so that this eccentric may be inserted and removed. An insert such as 35 may be pinned in proper position within the aperture 24 for holding the eccentric portion 32 in proper position vertically aligned with the lower aperture 23. Alternatively the projection 22 may be provided with a bearing plate which is removably connected to the upper surface of the projection 22 and which is provided with an aperture of proper diameter to accommodate the eccentric portion 32.

The cross member 15 at the opposite end of the frame 10 is provided with a pair of vertically spaced projections 36 which are similar to the projections 21 and 22 and which are similarly formed and spaced. An arm 37, identical with the arm 25, is provided with a bearing portion 39 at one end and a bearing portion 40 at its other end. The bearing 39 is designed to support an eccentric pivot 41 which is identical to the eccentric pivot 28 and which is supported and held in place in a similar manner.

The bearing 27 supports a vertical pivot shaft 42 which extends entirely through the bearing and which is provided at its upper extremity with a gear 43. A parallel shaft 44 extends vertically through the fixed bearing 17 and acts to support a cooperable gear 45. The gears 43 and 45 are in constant mesh so as to cause rotation of the shafts 42 and 44 in unison. The teeth of these gears are sufficiently long to permit the gears to move toward or away from one another within predetermined limits while still engaged to accommodate for different thicknesses of material being sealed.

Figure 7:
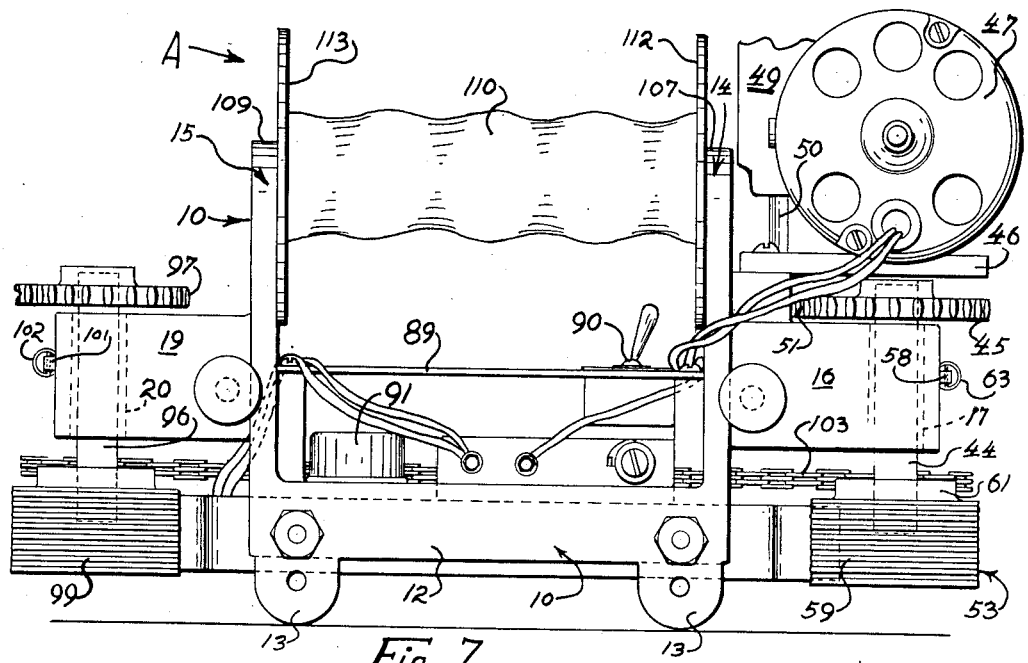
Figure 7 is a side elevation view of the heat sealing unit.
Figure 8:
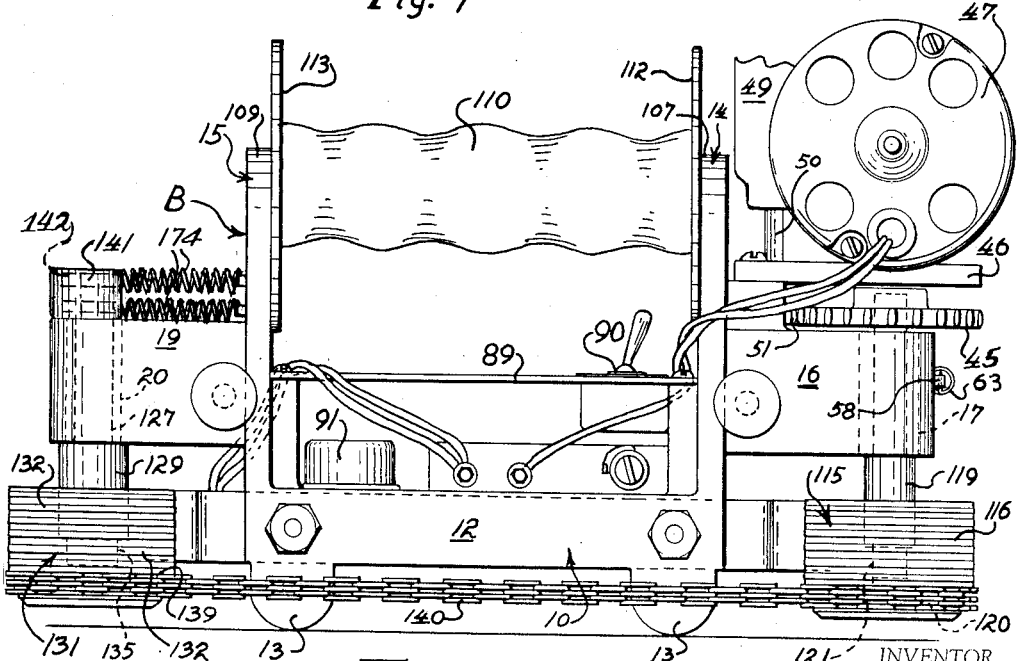
Figure 8 is a side elevation view of a modified form of construction of heat sealing unit.
Figure 9:
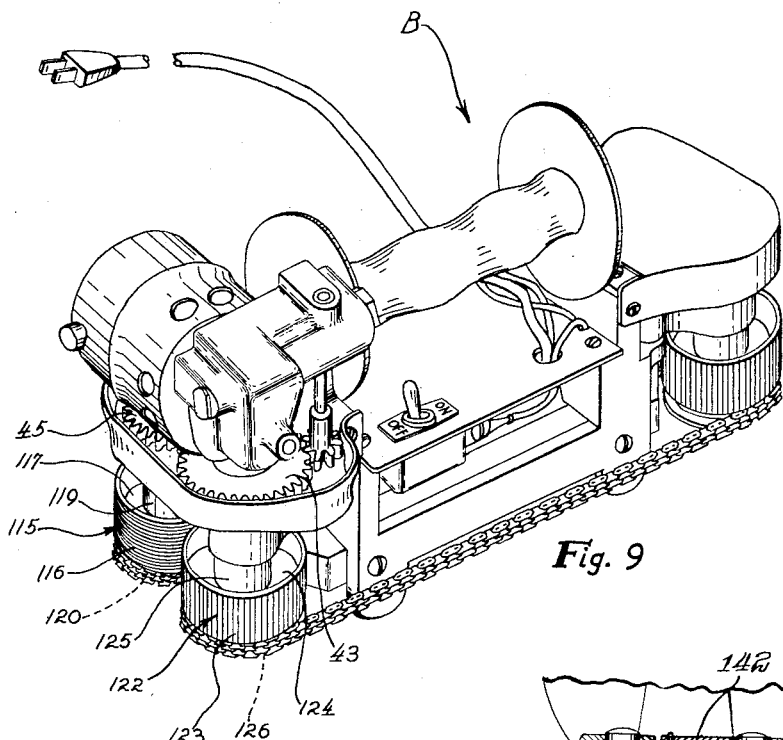
Figure 9 is a perspective view of the unit shown in Figure 8.
Figure 10:
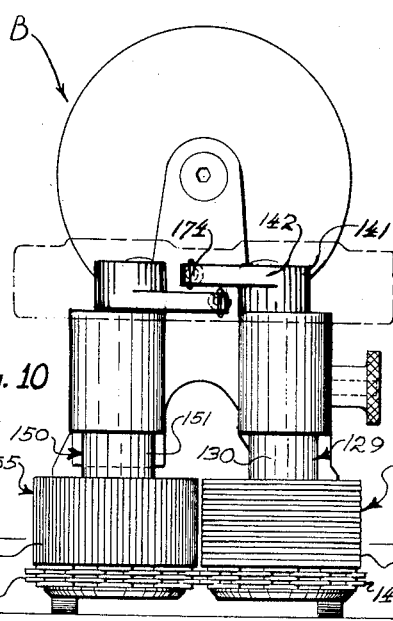
Figure 10 is an end elevation view of the unit of Figures 8 and 9.
Figure 14:
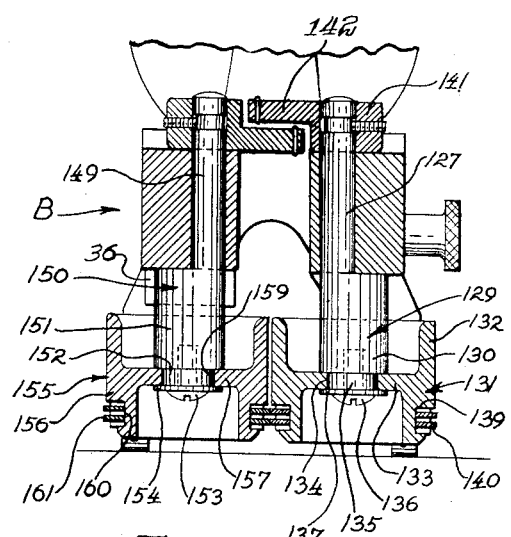
Figure 14 is a section at the plane indicated by the line 14—14 of Figure 11.

As best illustrated in Figure 7 of the drawings, a platform plate 46 is detachably connected to the cross member 14 of the frame 10 and extends laterally therefrom to overlie the upper ends of the shafts 42 and 44. A motor 47 is mounted upon the platform plate 46 and extends upwardly therefrom. A gear reduction housing 49 is connected to the motor 47 and contains suitable reduction gearing to reduce the speed of rotation of the output shaft. This gear reduction housing 49 supports a vertically extending driven shaft 50 which comprises the output power shaft. A pinion 51 is mounted upon the shaft 50 and meshes with the gear 45. Thus upon rotation of the motor 47 the pinion 51 is driven, causing rotation of the gears 45 and 43 and the shafts 42 and 44 on which they are mounted.

A pair of rollers 52 and 53 are mounted upon the shafts 42 and 44 respectively. The roller 53 includes a cylindrical outer shell 54 which is supported by a disc-shaped top 55 to an integral hub 56. The hub 56 is keyed or otherwise attached to the shaft 42 for rotation in unison therewith. A sprocket 57 is attached to the disc-like top 55 of the roller 53.

The roller 52 is constructed somewhat similarly to the roller 53 and includes a cylindrical outer shell 59 connected with the disc-like top member 60 to an integral hub 61. The hub 61 is keyed or otherwise attached to the shaft 44 for rotation in unison therewith. Thus rotation of the motor acts through the gears 43 and 45 to rotate the rollers 52 and 53 in opposite directions to engage a member to be heat sealed therebetween and to urge the member toward the opposite end of the heat sealing unit.

Figure 4:
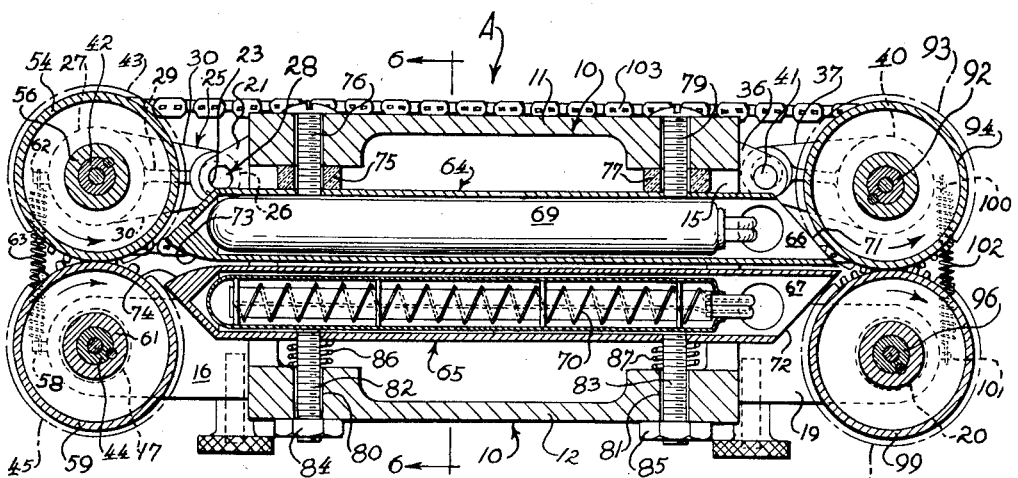
Figure 4 is a horizontal section through the heat sealing unit, the position of the section being indicated by the line 4—4 of Figure 2.

As indicated in Figure 4 of the drawings, a short lug 58 extends beyond the end of the integral projection 16 and a similar lug 62 projects from the end of the arm 25 having the bearing 27. A spring 63 connects the lugs 58 and 62 and tends to urge the rollers 52 and 53 into contacting relation. As a member to be heat sealed passes between these rollers they are spread apart somewhat but the driving gears 43 and 45 still continue in mesh.

The heating shoes are indicated in general by the numerals 64 and 65. Each of these heating shoes is shown as comprising a generally rectangular elongated bar having an aperture therein, the apertures being indicated at 66 and 67 respectively. The aperture 66 contains an elongated heating element 69, while the aperture 67 includes an elongated heating element 70. One end of each of the bars 64 and 65 is opened, this end being arranged at the outlet end of the machine. The open ends 71 and 72 of the bars 64 and 65 are preferably tapered as indicated so that the adjoining walls of the bars may extend as closely as possible to the rollers at the outlet end of the unit. The forward ends of the bars 64 and 65 are closed and are outwardly flared as indicated at 73 and 74 so as to receive the member to be heat sealed and to guide the member between the bars.

The bar forming the heating shoe 64 is supported by the side 11 of the frame 10. A spacer 75 which may, if desired, be of insulating material, is interposed between the side member 11 and the outer wall of the heating shoe 64 and a mounting screw 76 extends through the wall 11 and through the spacer 75 and is threaded into the wall of the shoe 64. A second spacer 77 is provided in longitudinally spaced relation with the spacer 75 and a mounting screw 79 extends through the wall of the side 11 and through the spacer 77 and is anchored in the wall of the heating shoe 64. Thus the heating shoe 64 is fixedly attached to the frame of the unit to extend along one side of the path of movement of the members to be heat sealed.

The second heating shoe 65 is supported for movement toward or away from the first heating shoe 64. The side member 12 of the frame 10 is provided with a pair of longitudinally spaced apertures 80 and 81 extending therethrough on axes normal to the plane of travel of materials being sealed. Studs 82 and 83 are slidably supported in the apertures 80 and 81 respectively and are threaded into the outer wall of the heating shoe 65. Nuts 84 and 85 on the outer ends of the studs 82 and 83 limit inward movement of the shoe 65 toward the heating shoe 64. Springs 86 and 87 urge the heating shoe 65 toward the heating shoe 64, these springs being interposed between the shoe 65 and the side member 12 of the frame 10.

Figure 6:
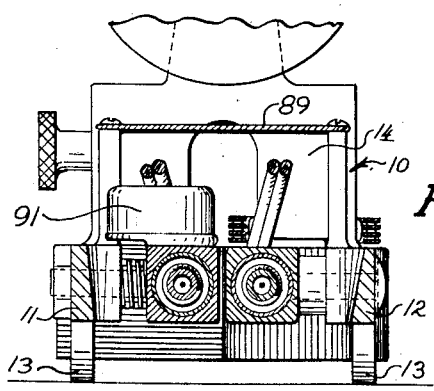
Figure 6 is a transverse sectional view, the position of the section being indicated by the line 6—6 of Figure 4.

The particular arrangement of the electrical circuit controlling the motor and the heating shoes is not shown in detail, the manner in which the elements may be attached being obvious. A platform 89 of insulating material is supported by the cross members 14 and 15 and the various elements necessary for controlling the current flow are mounted between the platform 89 and the heating shoes. The circuit controlling switch is indicated in Figure 1 by the numeral 90 and may if desired control both the heating elements and the motor. If preferred a separate switch may be provided for the heating circuit. A temperature indicator is indicated in general by the numeral 91 in Figure 6, this element being secured to one of the heating shoes. A control thermostat is ordinarily employed in the circuit so as to control the temperature of the heating elements. As such structure is commonplace in heat sealing equipment, it is not illustrated in detail.

A shaft 92 is supported by the bearing 40 of the arm 37 and extends vertically through this bearing. As best illustrated in Figure 2 of the drawings, a gear 93 is mounted upon the shaft 92 above the bearing 40 and a roller 94 is mounted below the bearing 40 on the shaft 92. The roller 94 is identical with the roller 53 and is provided with a sprocket 95 attached to the upper surface thereof. The sprocket 95 is rotatable in unison with the roller 94 and the shaft 92 and acts to drive the gear 93.

A shaft 96 is supported by the fixed bearing 20 on the projection 19 and extends above and below the bearing. A gear 97 is mounted upon the shaft 96 and is rotatable therewith. The gear 97 meshes with the gear 93 and is rotated thereby. A roller 99 is supported on the shaft 96 below the bearing 20. The roller 99 is identical with the previously described roller 52 and engages against the roller 94. A lug 100 projects beyond the arm 37 and a lug 101 projects beyond the fixed projection 19. A spring 102 connects the lugs 100 and 101 and tends to hold the roller 94 in contact with the roller 99.

A chain 103 connects the sprocket 57 with the sprocket 95 and causes rotation of the roller supporting shafts 42 and 92 at opposite ends of the unit. Thus rotation of the motor 47 causes rotation of the gear connected pairs of rollers at each end of the unit so that all of the rollers operate in unison.

A gear cover 104 is pivotally connected at aligned pivots 105 to the cross member 15 of the frame 10 and acts to enclose the gears 93 and 97 at the outlet end of the unit. A gear guard strip 106 is connected to the cross member 14 of the frame and encircles the gears 43, 45 and 51 for safety purposes. While the chain 103 is not enclosed, it is so located that there is little likelihood of anything becoming accidentally engaged between the chain and its sprockets.

The cross member 14 is provided with an upwardly projecting bracket member 107 and the cross member 15 is provided with a similarly upwardly projecting bracket member 109. An elongated handle 110 extends between the brackets 107 and 109 and is connected thereto by any suitable means 111, which may project through the axis of the handle 110 or may extend into the handle from opposite ends thereof. Circular guard discs 112 and 113 are interposed between the ends of the handle 110 and the brackets 107 and 109 in order to space the hand from the metal portions of the heat sealing unit. During use many of the metallic parts of the unit become heated to some extent and the discs 112 and 113 prevent discomfort to the operator due to contacting any heated metal parts.

The operation of the heat sealing unit A, illustrated in Figures 1 through 7 of the drawings, is believed obvious from the foregoing description. The heating shoes are first permitted to heat to the desired temperature as controlled by the thermostatically controlled switch. The member to be sealed is inserted between the rollers 52 and 53 and is urged thereby between the inlet ends of the heating shoes 64 and 65. The member continues in contact with the heating shoes throughout the length thereof and extends between the rollers 94 and 99 at the outlet end of the unit. These rollers travel at the same speed as the drive rollers 52 and 53 and tend to pull the member to be sealed between the heating shoes at a constant speed. The structure illustrated is particularly desirable where the member being sealed is equal in width or greater than the distance between rollers at opposite ends of the unit. When this is true one set of rollers is always in engagement with the member being sealed.

In the event the chain 103 should require tightening, such an adjustment is possible by proper manipulation of the eccentrics 31 and 41. The manner in which the eccentric may be used to tighten the chain 105 may be best shown in Figures 4 and 5. The upper ends 32 of the eccentrics are slotted as indicated in Figure 5 so that each eccentric may be rotated. As the relatively small diameter ends 32 and 33 are rotatably supported in the fixed lugs 21 and 22, the set screw 34 may first be loosened and the eccentrics rotated in either direction. This action moves the center or axis of the center portion 30 of the eccentric either away from or toward the opposite eccentric thereby increasing or decreasing the distance between the chain supporting shafts 42 and 92. When the sprockets 57 and 95 are the proper distance apart, the set screw 34 may be tightened to hold the adjusted eccentric in adjusted position.

In Figures 8 through 14 of the drawings a modified form of heat sealer B is illustrated. The heat sealer B is very similar to the heat sealer A, with the exception of the rollers, the chain arrangement, and the specific means employed for supporting the roller shafts. Accordingly other portions of the structure will not be described in detail.

In the modified form of unit B, the arm 25 is provided with a shaft 114 which is similar to the shaft 42. The shaft 114 supports a gear 43 at its upper end and supports a roller 122 at its lower end. The roller 122 includes a cylindrical shell 123 connected by a disc like support 124 to a hub 125. A sprocket 126 is attached to the lower extremity of the roller 127.

The fixed bearing 17 supports a parallel shaft 121. The shaft 121 is provided at its upper end with a gear 45. The shaft 121 supports at its lower end a roller 115 which includes a cylindrical outer shell 116, a supporting disc like web 117, and a hub 119. A sprocket 120 is supported at the lower extremity of the roller 115 for rotation therewith. At the opposite end or outlet end of the unit, the fixed bearing 20 supports a vertical shaft 127 which comprises a part of an eccentric indicated in general by the numeral 129. The eccentric 129 includes the relatively small diameter upper portion 127 and the relatively larger diameter portion 130 at its lower end which is arranged with its axis off-set from the axis of the portion 127. A roller 131 is supported at the lower extremity of the large diameter portion 130 and is axially arranged with respect thereto. The roller 131 includes a cylindrical outer portion 132 having an inwardly extending web 133 thereupon. The web is provided with an axial aperture 134 therethrough to accommodate the reduced diameter lower end 135 of the cam portion 129. A cap screw 136 extends axially into the portions 135 and 130 of the eccentric and act through a retaining washer 137 to hold the roller in place.

The roller 131 is provided with a groove 139 extending peripherally thereabout to accommodate the chain 140. The chain 140 extends in the groove 139 and extends about the sprocket 120 and is driven thereby.

The eccentric is provided at its upper extremity with the hub 141 of a lever arm 142. The ears 36 on the cross member 15 of the device support a pivot 143 which supports an arm 144. The arm 144 is generally similar to the arm 37 and includes a pair of spaced bearings 145 and 146 connected by a connecting web 147. The bearing 145 accommodates the pivot 143 while the bearing 146 supports the upper portion 149 of an eccentric 150 which is similar to the eccentric 129. The eccentric 150 includes a relatively large diameter lower portion 151 having a reduced diameter portion 152 at its lower extremity. A cap screw 153 holds a washer 154 in place to hold a roller 155 attached to the lower end of the eccentric. A lever 142 is mounted on the upper portion 149 of the eccentric 150. The two levers 142 are identical, but one is inverted relative to the other.

The roller 155 includes a cylindrical outer portion 156 having an inwardly extending web 157 therein which is apertured at 159 to accommodate the reduced diameter lower extremity 152 of the eccentric 150. The roller 155 is grooved as indicated at 160 to accommodate a chain 161. The chain 161 encircles the sprocket 126 and connects the sprocket with the roller 155. A lever arm 158 similar to the lever arm 142 is supported on the upper end of the portion 149 of the eccentric 150.

Figure 11:
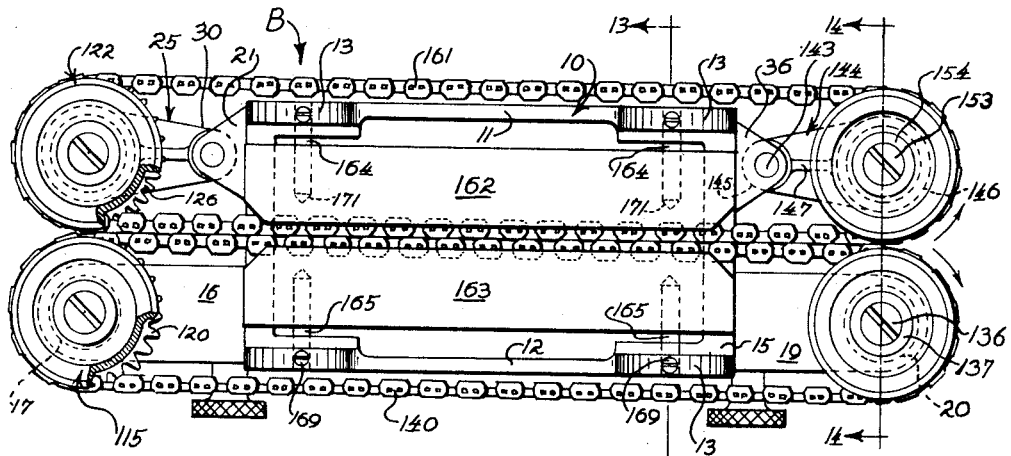
Figure 11 is a bottom plan view of the modified form of construction.
Figure 12:
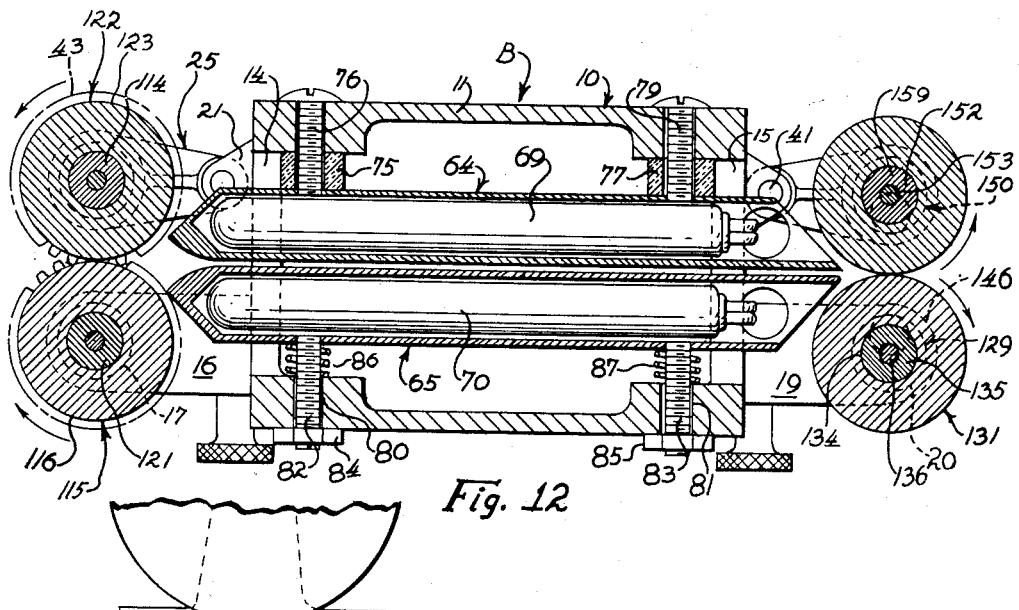
Figure 12 is a section on the line 12—12 of Figure 10.
Figure 13:
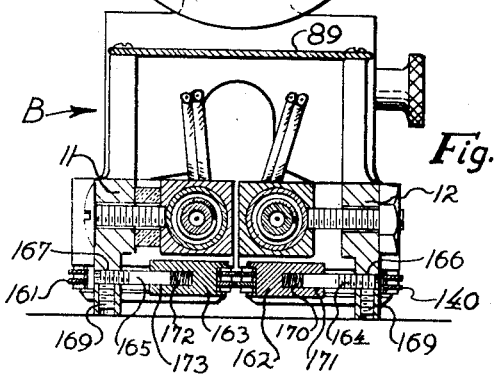
Figure 13 is a section at the plane indicated by the line 13—13 of Figure 11.

With reference now to Figures 11 and 13 of the drawings, it will be noted that means are provided for urging the adjacent portions of the chains 140 and 161 toward one another to clamp any article inserted therebetween. The chain guiding devices comprise elongated parallel bars 162 and 163, which are slidably supported upon pins extending inwardly from the side members 11 and 12 of frame 10. The pins supporting the guide 162 are indicated at 164 while the pins supporting the guide 163 are indicated at 165. The pins 164 are axially aligned with the pins 165.

As indicated in Figure 13 of the drawings, the pins 164 and 165 are externally threaded to fit into apertures 166 and 167 in the side portions 11 and 12 of the frame. Set screws such as 169 may be provided to hold the pins in proper position. Springs 170 are interposed between the end of the pins 164 and the body of the bar 163 at the base of the apertures 171 in which these bars are slidably supported. Similar springs 172 are interposed between the ends of the pins 165 and the bases of the apertures 173 in the bar 163. These springs 170 and 172 thus urge the bars against the chains and act to force the chains into contact.

The operation of the unit B is quite similar to the operation of the unit A. The heating unit is turned on and heats up the heating shoes 64 and 65. In order to seal a member, the member is inserted between the rollers 115 and 122, the chains engaging the member to be sealed at a point slightly below the rollers. The chains keep the member to be sealed clamped therebetween throughout the length of the unit, the portion of the member to be sealed which extends above the chains contacting the surfaces of the heating shoes and being sealed thereby. It will be noted that a member of virtually any length may be sealed with the unit B, it not being necessary that the member be of a length equal to the distance between the rollers at opposite ends of the unit. The chains travel at a predetermined speed so as to maintain the member to be sealed in contact with the heating shoes a sufficient length of time to produce the necessary seal. Thus by proper arrangement of the speed of travel of the chains and by regulating the temperature of the heating shoes a proper heat seal may be produced on most types of materials.

The chains 140 and 161 are held with the proper amount of tension of action of the eccentrics 129 and 150. Suitable spring means 174 are provided for rotating the eccentrics about the upper portions 127 and 149 of these eccentrics, the rotative movement tending to tighten the chains and maintain them in a taut condition. The spring means 174 also acts to keep the rollers 131 and 155 in close proximity so as to engage the member to be sealed therebetween.

It will be noted that the device accomplishes the objects of the invention. The unit may be easily lifted, carried or handled and will function effectively either in an upright position or supported in a horizontal or inclined position. The driven rollers serve to insure engagement of the member to be sealed with the heating shoes for a predetermined time period sufficient to cause an effective seal. Once this predetermined time period and the proper temperature for the heating shoes to accomplish the seal have been determined the device will function automatically to maintain this time interval and temperature so that the device may be continuously operated over long periods of time if desired, without requiring adjustment or care.

In accordance with the patent statutes, the principles of construction and operation of the hand heat sealing unit have been described, and while it has been endeavored to set forth the best embodiments thereof, it is desired to have it understood that these are only illustrative thereof and that obvious changes may be made within the scope of the following claims without departing from the spirit of the present invention.

I claim:

1. A portable hand manipulated electrical self contained heat sealing unit including an elongated frame, journals extending beyond the remainder of the frame at both ends thereof, and rollers supported on parallel vertical axis in said journals, one pair of rollers being supported at each end of said frame, means connecting said rollers for rotation in unison, an electric motor supported by said frame at one end thereof, means connecting said motor to said rollers to actuate the same, a non-metallic platform secured to said frame, uprights on said frame at opposite ends of said platform, a handle extending between said uprights above said platform, and heating shoes supported by said frame between said pairs of rollers and beneath said platform.

2. The structure defined in claim 1 and including non-metallic shields at each end of said handle.

3. The structure defined in claim 1 and including spaced legs on said frame extending beneath the level of said rollers and heating shoes.

4. A hand manipulated electrical self-contained heat sealing unit including an elongated frame, a pair of fixed arms extending longitudinally from said frame at opposite ends thereof, a pair of hinged arms pivotally secured to said frame along vertical pivots, said fixed arms and said hinged arms having parallel journals therein having vertical axes, rollers pivotally supported in said journals, means connecting said rollers to rotate the same in unison, motor means supported by said frame at one end thereof, means connecting said motor means to said rollers to actuate the same, and heating shoes extending longitudinally of said frame and supported thereby.

5. The structure defined in claim 4 and including a handle supported by said frame between the ends thereof.

6. The structure defined in claim 4 and including a handle supported by said frame between the ends thereof and extending longitudinally thereof.

References Cited in the file of this patent

UNITED STATES PATENTS

| | | |
|---|---|---|
| 1,089,667 | Poalk | Mar. 10, 1914 |
| 1,851,039 | Fausek | Mar. 29, 1932 |
| 2,376,253 | Humphrey | May 15, 1945 |
| 2,392,695 | Rohdin | Jan. 8, 1946 |
| 2,469,972 | Lowry et al. | May 10, 1949 |
| 2,542,901 | Chaffee | Feb. 20, 1951 |
| 2,566,799 | Humphrey | Sept. 4, 1951 |
| 2,597,634 | Grevich | May 20, 1952 |